US012756565B2

(12) United States Patent
Matteson et al.

(10) Patent No.: US 12,756,565 B2
(45) Date of Patent: Oct. 6, 2026

(54) EFFICIENT USE OF TOKENS IN AUTHENTICATION SYSTEM

(71) Applicant: Visa International Service Association, San Francisco, CA (US)

(72) Inventors: Corrine Matteson, Round Hill, VA (US); Josephine Harrison Brinkman, Purcellville, VA (US); Shawn Damon, Singapore (SG)

(73) Assignee: Visa International Service Association, San Francisco, CA (US)

( * ) Notice: Subject to any disclaimer, the term of this patent is extended or adjusted under 35 U.S.C. 154(b) by 83 days.

(21) Appl. No.: 18/784,679

(22) Filed: Jul. 25, 2024

(65) Prior Publication Data

US 2025/0038981 A1 Jan. 30, 2025

Related U.S. Application Data

(60) Provisional application No. 63/515,708, filed on Jul. 26, 2023.

(51) Int. Cl.
*H04L 9/32* (2006.01)

(52) U.S. Cl.
CPC .................................. *H04L 9/3213* (2013.01)

(58) Field of Classification Search
CPC ..................................................... H04L 9/3213
See application file for complete search history.

(56) References Cited

U.S. PATENT DOCUMENTS 9,105,027 B2 8/2015 Hammad et al.
10,282,726 B2 * 5/2019 Aabye .................... G06Q 20/12
10,552,796 B1 * 2/2020 Delacourt ............ G06Q 10/103
10,552,834 B2 * 2/2020 Dimmick ............. G06Q 20/382
11,238,140 B2 * 2/2022 Dean ................. H04W 12/0471
11,398,910 B2 7/2022 Girish et al.
11,849,042 B2 * 12/2023 Verstraeten ........... H04L 9/3263
2010/0257102 A1 * 10/2010 Perlman ................. G06Q 30/06 705/44
2011/0208658 A1 * 8/2011 Makhotin ............ G06Q 20/401 235/380
2013/0346302 A1 * 12/2013 Purves ................ G06Q 20/102 705/40
2015/0127547 A1 * 5/2015 Powell .............. G06Q 20/4016 705/67

(Continued)

OTHER PUBLICATIONS

EMV 3-D Secure; Protocol and Core Functions Specification Version 2.3.1.1; pp. 1-410, May 2023.*

*Primary Examiner* — Mohammad A Siddiqi

(74) *Attorney, Agent, or Firm* — Kilpatrick Townsend & Stockton LLP

(57) ABSTRACT

A method is disclosed. The method comprises a directory server computer receiving an authentication request message comprising a token and transmitting a de-tokenization request message comprising the token to a token service computer. The token service computer determines a credential associated with the token. The method further comprises receiving the credential and determining that the token or the credential does not require additional user authentication processing. The method further comprises transmitting an authentication response message with an authentication indicator indicating the transaction is authenticated to an authentication server computer.

20 Claims, 8 Drawing Sheets

(56) References Cited

U.S. PATENT DOCUMENTS

| | | | | |
|---|---|---|---|---|
| 2016/0028550 | A1* | 1/2016 | Gaddam | H04L 63/0823<br>713/173 |
| 2016/0314458 | A1* | 10/2016 | Douglas | G06Q 20/321 |
| 2019/0333055 | A1 | 10/2019 | Mohammed et al. | |
| 2021/0243194 | A1* | 8/2021 | Nelsen | G06F 21/335 |
| 2023/0062507 | A1* | 3/2023 | Aabye | H04L 9/3271 |

* cited by examiner

EFFICIENT USE OF TOKENS IN AUTHENTICATION SYSTEM

CROSS-REFERENCES TO RELATED APPLICATIONS

This application is a non-provisional application which claims priority to U.S. Provisional Application No. 63/515,708, filed on Jul. 26, 2023, which is herein incorporated by reference in its entirety.

BACKGROUND

Transactions conducted using credentials are subject to hacking and man-in-the-middle attacks. As such, ways to protect such credentials while also providing appropriate authentication of transactions conducted using the credentials are needed. Further, in situations where there is one credential that is associated with multiple users, it is difficult to perform user authentication for a particular transaction since it may be unclear which user of the multiple users needs to be authenticated.

Embodiments of the disclosure address this problem and other problems individually and collectively.

BRIEF SUMMARY

A method is disclosed. The method comprises: receiving, by a directory server computer from an authentication server computer in a transaction, an authentication request message comprising a token, wherein the token was previously obtained by a resource provider computer from a user device, the user device associated with a user; transmitting, by the directory server computer, a de-tokenization request message comprising the token to a token service computer, wherein the token service computer determines a credential associated with the token, wherein the token is one of a plurality of tokens associated with the credential; receiving, by the directory server computer, the credential; determining, by directory server computer, that the token or the credential does not require additional user authentication processing; and transmitting an authentication response message with an authentication indicator indicating that the transaction is authenticated to the authentication server computer.

Another embodiment of the invention includes a directory server computer comprising: a processor; and a non-transitory computer readable medium comprising code, executable by the processor to perform a method comprising: receiving, from an authentication server computer in a transaction, an authentication request message comprising a token, wherein the token was previously obtained by a resource provider computer from a user device, the user device associated with a user; transmitting, by the directory server computer, a de-tokenization request message comprising the token to a token service computer, wherein the token service computer determines a credential associated with the token, wherein the token is one of a plurality of tokens associated with the credential; receiving, by the directory server computer, the credential; determining, by directory server computer, that the token or the credential does not require additional user authentication processing; and transmitting an authentication response message with an authentication indicator indicating that the transaction is authenticated to the authentication server computer.

Another embodiment of the invention comprises a method. The method comprises: receiving, by an authentication server computer, a transaction message comprising a token for a transaction from a resource provider computer, wherein the token is one of a plurality of tokens linked to a credential for an account; transmitting, by the authentication server computer, to a directory server computer, an authentication request message comprising the token, wherein the directory server computer obtains the credential from a processing network computer, determines that the token or the credential does not require additional user authentication processing, and transmits an authentication response message with an authentication indicator indicating that the transaction is authenticated to the authentication server computer; receiving, by the authentication server computer, the authentication response message comprising the authentication indicator; and transmitting, by the authentication server computer, the authentication response message comprising the authentication indicator to the resource provider computer, wherein the resource provider computer generates an authorization request message comprising the authentication indicator and transmits the authorization request message to an authorizing entity computer for authorization.

Another embodiment of the invention includes an authentication server computer comprising: a processor; and a non-transitory computer readable medium comprising code, executable by the processor to perform a method comprising: receiving a transaction message comprising a token for a transaction from a resource provider computer, wherein the token is one of a plurality of tokens linked to a credential for an account; transmitting to a directory server computer, an authentication request message comprising the token, wherein the directory server computer obtains the credential from a processing network computer, determines that the token or the credential does not require additional user authentication processing, and transmits an authentication response message with an authentication indicator indicating that the transaction is authenticated to the authentication server computer; receiving the authentication response message comprising the authentication indicator; and transmitting the authentication response message comprising the authentication indicator to the resource provider computer, wherein the resource provider computer generates an authorization request message comprising the authentication indicator and transmits the authorization request message to an authorizing entity computer for authorization.

These and other embodiments are described in further detail below.

Terms

Before discussing specific embodiments of the invention, some descriptions of some terms may be helpful.

A "user device" may be any suitable device that can perform computations and that can communicate with other devices. Examples of user computing devices can include mobile devices, desktop computers, etc.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device (e.g., using the other device as a relay), both devices taken together may be considered a single mobile device).

A "secure authentication system" may one or more computing devices (e.g., servers) that provide secure authentication of users with respect to transactions conducted between two entities (e.g., users and resource providers). Some examples of secure authentication systems include Verified by Visa™, MasterCard SecureCode™, and American Express SafeKey™.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "credential" may be any suitable information that serves as reliable evidence of worth, ownership, identity, or authority. A credential may be a string of numbers, letters, or any other suitable characters that may be present or contained in any object or document that can serve as confirmation. User credential examples can be a primary account number, driver's license ID, social security number, etc.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An "authorizing entity computer" may be operated by, or on behalf of, an authorizing entity. An authorizing entity computer may include an "access control server computer" that may be configured to authenticate a user.

An "access control server computer" may be computer that can authenticate a user. An access control server computer can receive authentication request messages. An access control server computer may be configured to transmit challenge request messages and receive challenge response messages from a user device (or application operating thereon). In some embodiments, the access control server computer may be further configured to verify the enrollment of an account in a secure authentication system, perform a risk analysis to determine whether the transaction should be authenticated, and return an authentication response message to a resource provider computer (e.g., via a directory server computer).

A "directory server computer" may include a server that can perform message routing. In some embodiments, the directory server computer may be capable of receiving messages (e.g., authentication request messages, authentication response messages, etc.), determining the appropriate destination computer for the received messages, and routing the received messages to the appropriate destination computer (e.g., an access control server computer). In some embodiments, the directory server computer may include or be associated with a database containing routing tables that may be used to determine an appropriate authorizing entity computer associated with an account identifier (e.g., a bank identification number). In some embodiments, the directory server computer may be further configured to perform an enrollment verification process for an account identifier and a risk analysis process.

A "processing network computer" may include a server computer used for transaction processing. In some embodiments, the processing network computer may be coupled to a database and may include any hardware, software, other logic, or combination of the preceding for servicing the requests from one or more client computers.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network, including the Internet.

The processing network computer may process transaction-related messages (e.g., authorization request messages and authorization response messages) and determine the appropriate destination computer (e.g., issuer computer) for the transaction-related messages. In some embodiments, the processing network computer may authorize transactions on behalf of an issuer. The processing network computer may also facilitate the clearing and settlement of financial transactions.

A "transaction request message" may be an electronic message that indicates that the user has initiated a transaction with a resource provider. A transaction request message may include transaction data associated with the transaction.

A "transaction response message" may be a response to a transaction request message.

"Transaction data" may include data related to a transaction. Transaction data may include data for a specific transaction, including items purchased, item prices, total cost, shipping address, billing address, payment methods (e.g., a primary account number, card number, etc.), resource provider data (e.g., merchant data), user-specific data, user device data, etc.

"User device data" may include data associated with a user device. User device data may refer to data regarding a portable computing device, such as a computer or mobile phone. Examples of user device data may include unique device identifiers for a computer or mobile phone, an IP address, SIM card data, application data, mobile application data, browser data, and device make and model data. User device data may also include the device's MSISDN, or Mobile Subscriber Integrated Services Digital Network-Number, which is a number that uniquely identifies a subscription in a mobile network.

"User-specific data" may include data specific to a user. User-specific data may include a name, mailing address, shipping address, billing address, phone number, payment account number, date of birth, marital status, income, social security number, demographic data, etc. In some embodiments, user-specific data may also include consumer preferences, notification methods, and prior transaction history.

A "challenge request message" may include a message sent as part of an authentication process for a user and/or user device. In some embodiments, the challenge request message may contain a request for the user to submit a pre-established authentication data in order to authenticate an account or payment device. The challenge request message may be generated and sent (e.g., by an access control server computer) prior to authenticating the account or payment device.

A "challenge response message" may include a message sent as part of an authentication process for a user and/or user device. In some embodiments, the challenge response message may be transmitted from a user device to an access control server computer or a directory server computer. The challenge response message may contain authentication data in order to authenticate an account or payment device.

"Authentication data" may include any data suitable for authenticating a user or a user device. Authentication data may be initially obtained from a user or a device that is operated by the user. Examples of authentication data obtained from a user may include PINs (personal identification numbers), passwords, etc. Examples of authentication data that may be obtained from a device may be include device serial numbers, hardware secure element identifiers, device fingerprints, biometric information of the user, phone numbers, IMEI numbers, etc.

A "token" may be a substitute value for a credential. A token may be a string of numbers, letters, or any other suitable characters. Examples of tokens include payment tokens, access tokens, personal identification tokens, etc. A virtual account identifier can be an example of a token.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle, or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "virtual account" may be an example of a "virtual record," and can appear to be, or behave like, a real account (e.g., a primary account). Thus, a virtual account may be used in a variety of payment use cases. Sometimes a virtual account may be referred to as a "pseudo account." A virtual account may be represented by a virtual account number (also referred to as a virtual card number (VCN) or a token) and may be associated with a funding account (e.g., a primary account number (PAN)). A virtual account may be generated using a credential (e.g., a funding PAN) associated with the funding account. The use of the virtual account may be restricted, and the controls on the use of the virtual account can be managed by a control system. In an embodiment, the expiry date of a virtual account is the same as the funding account, and the CVV of the virtual account is different than the CVV for the funding account.

"Tokenization" is a process by which data is replaced with substitute data. For example, a payment account identifier (e.g., a primary account number (PAN)) may be tokenized by replacing the primary account identifier with a substitute number (e.g., a token) that may be associated with the payment account identifier. Further, tokenization may be applied to any other information that may be replaced with a substitute value (e.g., token). Tokenization may be used to enhance transaction efficiency, improve transaction security, increase service transparency, or to provide a method for third-party enablement.

A "token service computer" can be any suitable device that services tokens. In some embodiments, a token service computer can facilitate requesting, determining (e.g., generating) and/or issuing tokens, as well as maintaining an established mapping of tokens to values (e.g., primary account numbers (PANs)) in a repository (e.g., token vault). The token service computer may include or be in communication with a token vault where the generated tokens are stored. The token service computer may support token processing of transactions (e.g., payment transactions) submitted using tokens by de-tokenizing the token to obtain the original value (e.g., the PAN).

A "token cryptogram" is a cryptogram that is associated with a token. An example of a token cryptogram can be a token authentication verification value (TAVV). A token cryptogram may be a string of numbers, letters, or any other suitable characters, of any suitable length. In some embodiments, a token cryptogram may include encrypted token data associated with a token (e.g., a token domain, a token expiry date, etc.). A token cryptogram may be used to validate the token. For example, a token cryptogram may be used to validate that the token is being used within a token domain and/or by a token expiry date associated with the token.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and resource provider identifiers (e.g., merchant identifiers) to uniquely identify where the token can be used. A set of parameters (e.g., token domain restriction controls) may be established as part of token issuance by the token service provider that may allow for enforcing appropriate usage of the token in transactions.

"Token expiry date" may refer to the expiration date/time of the token. The token expiration date may be a numeric value (e.g., a 4-digit numeric value). In some embodiments, the token expiry date can be expressed as a time duration as measured from the time of issuance.

A "authentication verification value" may be a value that can be validated to prove that an authentication process was performed. An authentication verification value may be in the form of a digital signature. The digital signature may be a cryptogram that is generated after a computer such as an access control server signs transaction data with a key (e.g., a private or a symmetric key). An example of a verification value is a cardholder authentication verification value, or CAVV. The authentication verification value may be used in an authorization of a financial transaction as proof that an issuer or other authorizing entity authenticated a user.

An "authorization request message" may be an electronic message that is sent to a transaction processing computer and/or an authorizing entity computer (e.g., issuer of a payment card) to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an authorizing entity computer or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an authorizing entity (e.g., an issuer bank) returns in response to an authorization request message in an electronic message (either directly or through the transaction processing computer) to a resource provider computer that indicates approval of the transaction. The code may serve as proof of authorization. In some embodiments, a transaction processing computer may generate or forward the authorization response message to the resource provider.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

DETAILED DESCRIPTION

Figure 1:
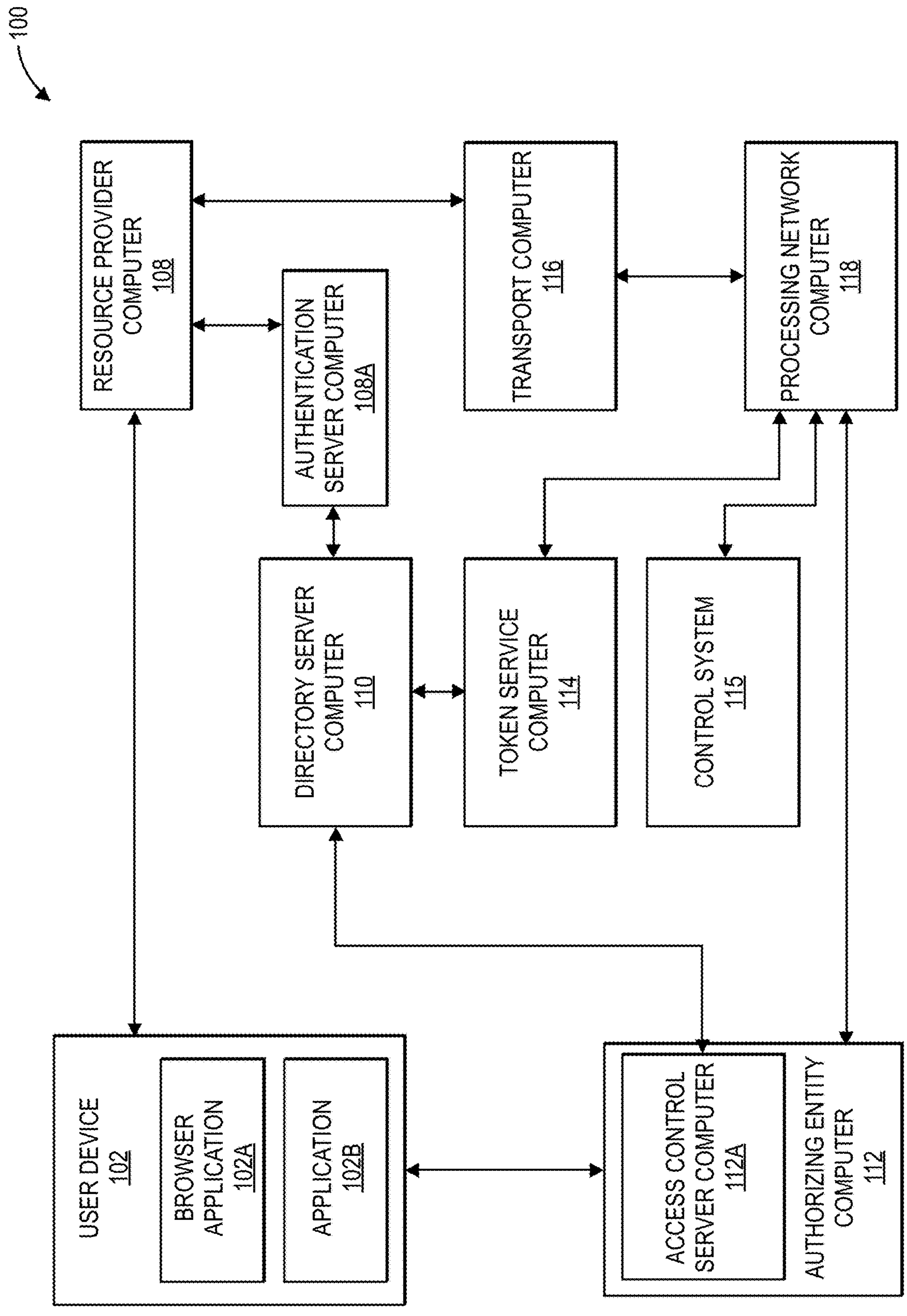
FIG. 1 illustrates a block diagram of a system according to an embodiment.

FIG. 1 illustrates a block diagram of a system 100 according to an embodiment. The system 100 may be used to facilitate data communications between the various computers depicted in FIG. 1 for authentication and/or authorizing financial and non-financial transactions. The system 100 includes a user device 102 which can be in communication with a resource provider computer 108 and an authorizing entity computer 112, which may include or be associated with an access control server computer 112A. The resource provider computer 108 can be in communication with an authentication server computer 108A. The authentication server computer 108A can be in communication with the authorizing entity computer 112 via a directory server computer 110. The directory server computer 110 can be in communication with a token service computer 114. The resource provider computer 108 can also be in communication with the authorizing entity computer 112 via a transport computer 116 and a processing network computer 118. The processing network computer 118 can be in communication with the token service computer 114 and a control system 115.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The user device 102 may include a browser and/or applications (e.g., the browser application 102A, application 102B, etc.) stored in the memory and configured to retrieve, present, and send data across a communications network (e.g., the Internet).

The user device 102 may be configured to send data (e.g., utilizing browser application 102A and/or application 102B) to any suitable destination (e.g., resource provider computer 108) as part of a transaction request message. The data may include user device data, user-specific data, transaction data, a token, and/or any suitable data. In some examples, the data may also include payment device data, geolocation data, user address, user email address, user phone number, account data, or other comparable data. In some embodiments, the browser application 102A or the application 102B used in the transaction may determine the particular data to be sent in an authentication request message.

The resource provider computer 108 may include any suitable computational apparatus operated by a resource provider. The resource provider computer 108 may be, for example, an access device or a point of sale device. In some embodiments, the resource provider computer 108 may include a web server computer that may host one or more websites associated with the resource provider.

In some embodiments, the resource provider computer 108 may be configured to send data to an access control server computer 112A via a directory server computer 110 and the authentication server computer 108A as part of an authentication process for a transaction between the user (e.g., consumer) and the resource provider. The resource provider computer 108 may also be configured to generate authorization request messages for transactions between the resource provider and a user, and route the authorization request messages to an authorizing entity computer 112 for additional transaction processing.

In some embodiments, the resource provider computer 108 may transmit data through a communications medium to a transport computer 116 as part of an authorization process for a transaction. In some embodiments, the resource provider computer 108 may receive transaction data from user device 102 and transmit the transaction data to the transport computer 116 for transaction-related processes (e.g., authorization) in an authorization request message.

The authentication server computer 108A may be a server computer configured to initiate and perform an authentication process (e.g., the resource provider computer 108 and the directory server computer 110). The authentication server computer 108A may send and receive authentication request messages and authentication response messages.

The directory server computer 110 may be a server computer configured to route messages between computers. For example, the directory server computer 110 may route messages between the authentication server computer 108A and the access control server computer 112A. In some embodiments, the directory server computer 110 may be operated by processing network computer 118.

The authorizing entity computer 112 is operated by an authorizing entity. An example of an authorizing entity can be an issuer, which can be an entity (e.g., a bank) which issues and maintains accounts for its users. The authorizing entity computer 112 may issue payment devices for user accounts (e.g., consumer accounts), including credit cards and debit cards, and/or may provide user accounts stored and accessible via the user device 102. The authorizing entity computer 112 may be configured to conduct authorization processes. The authorizing entity computer 112 may include the access control server computer 112A. In other embodiments, the access control server computer 112A may be separate and distinct from the authorizing entity computer 112.

The access control server computer 112A may comprise a server computer that may be configured to conduct authentication processes. The access control server computer 112A may be associated with an issuer, which can be an authorization entity (e.g., bank, financial institution) that issues and maintains financial accounts for a user. The access control server computer 112A may use user-specific data, user device data, transaction data, PAN, payment device data, geolocation data, account data, transaction controls, or other comparable data, in order to perform an authentication for the transaction or forgo performing the authentication for the transaction. In some embodiments, at the time of a transaction, the access control server computer 112A may perform the authentication, and may provide an authentication response message to the resource provider computer 108 via the directory server computer 110.

The token service computer 114 can perform token processing and is described in further detail above and below.

The control system 115 may implement controls on the use of tokens. For example, a funding account may be associated with a credential and may be operated by a funding entity (e.g., an employer), and the credential may be associated with first, second, and third tokens that are provided to three different users (e.g., three employees). The first token can have a control which limits its use to weekdays, the second token can have a control which limits the use of the token for transactions of certain value limits, and the third token can have a control which limits its use to certain types of merchants. The control system 115 can store the rules for the control of the use of the tokens.

The processing network computer 118 may include data processing subsystems, networks, and operations used to support and deliver authorization services, exception file services, and clearing and settlement services, and is described above and below.

Figure 2:
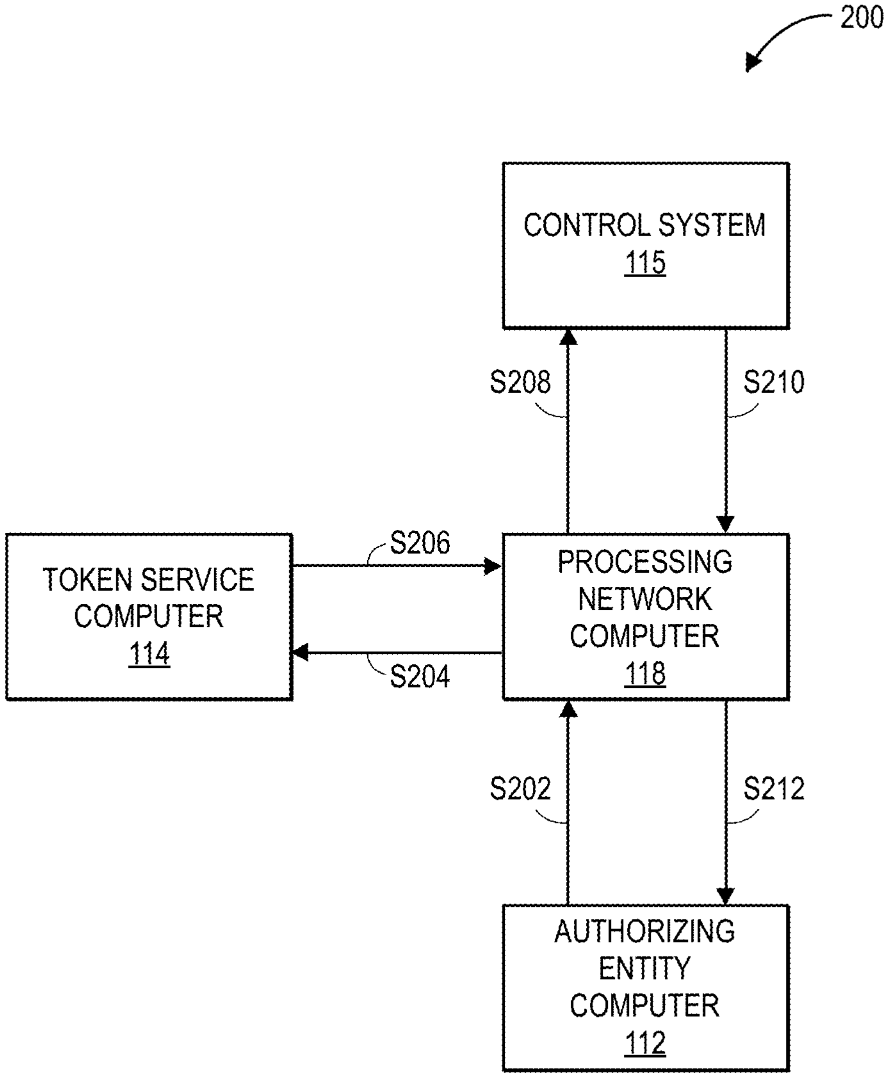
FIG. 2 illustrates an exemplary block diagram of a system and an exemplary method for enrolling an account into a payment services platform.

FIG. 2 illustrates an exemplary block diagram of a system 200 and an exemplary method for creating a funding account and multiple tokens associated with the funding account. In the creation of a funding account, an entity such as an employer may wish to open a funding account and create tokens associated with the funding account. The employer may contact an authorizing entity (e.g., an issuer) that operates the authorizing entity computer 112 in FIG. 2. The tokens can be provided to the employees of the employer. In some cases, payment cards with the tokens can be given to the employees. In other cases, the tokens can be downloaded to the user devices operated by the employees and stored in digital wallets or the like. The system 200 also includes a processing network computer 118, a token service computer 114, and a control system 115.

At step S202, the authorizing entity computer 112 may transmit an enrollment request to the processing network computer 118. The enrollment request can include a request to open a funding account and create a credential (e.g., a PAN) for the funding account, if the funding account is not yet in existence. The enrollment request or another communication from the authorizing entity computer to the processing network computer 118 may include the number of tokens desired by the entity and any transaction controls associated with the use of the tokens, or even the use of the credential associated with the funding account. After receiving the enrollment request, the processing network computer 118 can fund the funding account with funds transferred from the authorizing entity computer 112. In some embodiments, the funding account can be created and funded by the authorizing entity operating the authorizing entity computer 112.

At step S204, processing network computer 118 can transmit a token request message to the token service computer 114. The token request message may comprise the credential associated with the funding account, as well as an indication of the number of tokens to be created. Each token that is created by token service computer 114 in response to the token request message may be associated with the credential.

At step S206, responsive to the token request message, the token service computer 114 can obtain the requested tokens. They may be derived from the credential or selected from a pre-existing pool of tokens. The token service computer 114 can then provide the tokens to the processing network computer 118, which may provide them to the authorizing entity computer 112. The authorizing entity operating the authorizing entity computer 112 can then provide the tokens to the users (e.g., employees) of the funding entity (e.g., an employer). In some embodiments, the processing network computer 118 can store information indicating that the credential is linked to the tokens, and may optionally pass this information onto a directory server (not shown in FIG. 2).

At step S208, processing network computer 118 may transmit the controls for the tokens, the tokens, and optionally the funding credential to the control system 115.

One type of transaction control can be based on a type of spending or spending amount: block all ATM cash withdrawals, block cash access transactions, block purchases above a predefined threshold amount, block all E-commerce purchases, block E-commerce purchases above a predefined threshold amount (e.g., dollar amount), block all purchases made over the internet, phone or through mail order, or stop authorization after a predetermined spend velocity (e.g., spending in a given period of time) or account balance is reached.

Another type of transaction control can be based on time. An example supported time rule may be: block transactions conducted outside of predefined business hours.

Another type of transaction control can be based on specific transaction characteristics. An example supported exact match rule may be: block transactions that do not have a predefined dollar amount and currency type.

Another type of transaction control can be used on transaction category rules. Transactions can be blocked or allowed from categories such as: Travel, Lodging, Auto Rental, Restaurant, Fuel, Jewelry, Electronics, Alcohol and Tobacco, Ground Transportation, Office Supply, Grocery Stores and Pharmacies, Entertainment, Utilities, Clothing and General Retail, and Medical.

Another type of transaction control can be based on locations of users or resource providers. Some example supported location rules may be: block all purchases from merchants outside the United States, block purchases outside the US which exceed the given limit, and block purchases conducted outside of a particular state.

At step S210, the control system 115 may transmit an indication to the processing network computer 118 indicating that transaction controls for one or more tokens and/or PANs have been successfully set.

At step S212, processing network computer 118 may transmit the indication to authorizing entity computer 112 indicating that transaction controls for one or more tokens and/or PANs have been successfully set. The indication may further indicate the credential (e.g., a funding PAN) for the user was added into the processing network computer 118 based on the request in step S202.

Figure 3:
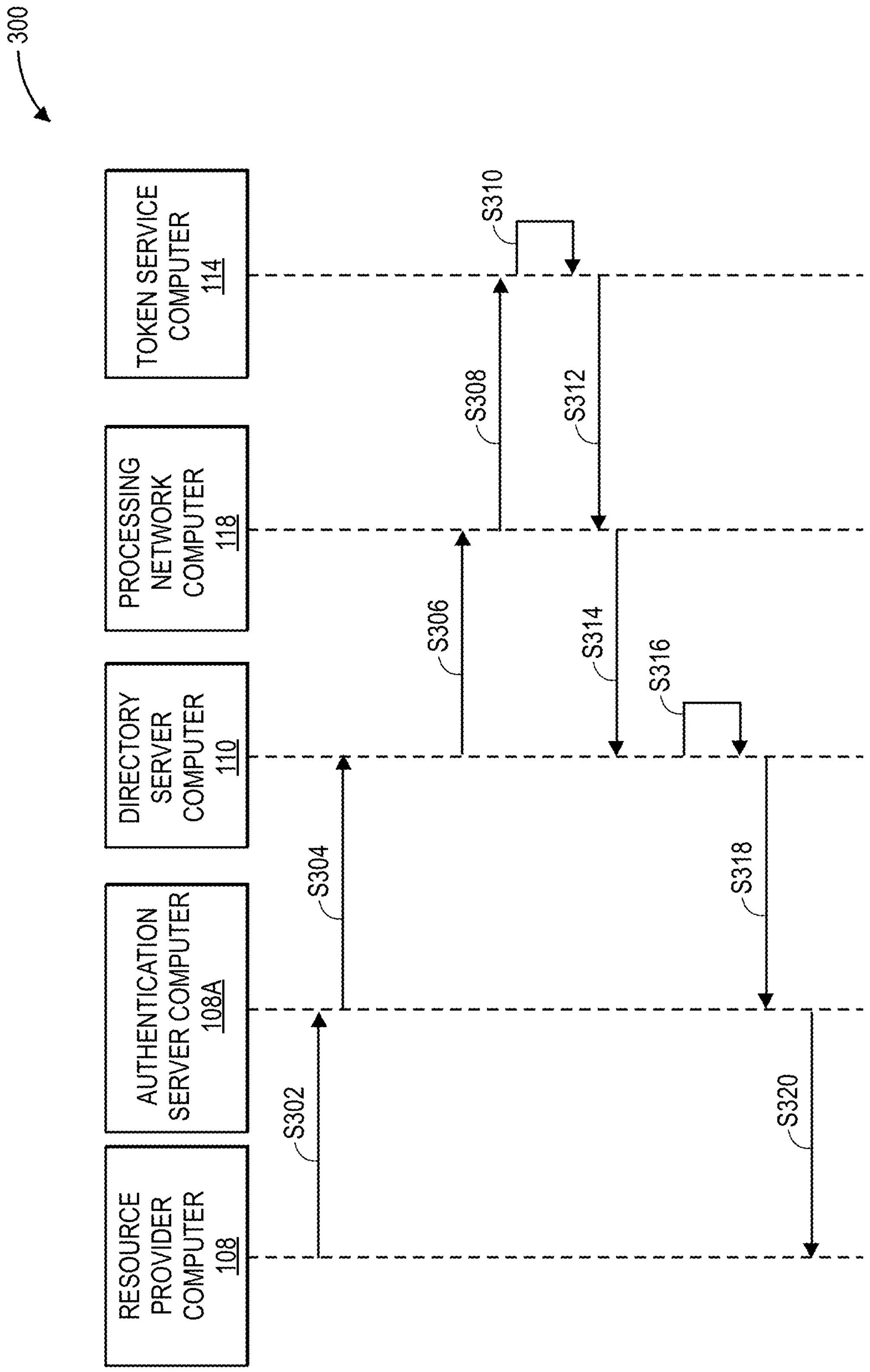
FIG. 3 illustrates a flow diagram of a method of performing authentication according to some embodiments of the invention.

FIG. 3 illustrates a flow diagram of a method 300 of performing authentication according to some embodiments of the invention. The illustrated flow diagram includes a resource provider computer 108, an authentication server computer 108A, a directory server computer 110, a processing network computer 118, and a token service computer 114.

At step S302, resource provider computer 108, which may operate a resource provider website (e.g., a merchant website) operated by a resource provider (e.g., a merchant), may generate and transmit a transaction message to the authentication server computer 108A. The generation and transmission of the transaction message can be in response to a user that wishes to conduct a transaction with the resource provider to obtain a resource (e.g., access to a secure location, access to secure data, goods or services, etc.) from the resource provider. The transaction message may comprise at least a value for the interaction (e.g., a transaction amount), and a token that was obtained by the resource provider computer 108 from a user device operated by the user. As described above, with respect to the process flow in FIG. 2, the token may be one of a plurality of tokens associated with a credential (e.g., a PAN) associated with a funding account. In some embodiments, each of the plurality of tokens may be linked to different virtual accounts (e.g., virtual accounts used by different users). In some embodiments, more than one of the plurality of tokens are linked to the same virtual account.

In some embodiments, the transaction request message may also include a location of the resource provider computer 108, a location of the user device, an identifier of the resource provider computer 108, a date and a time of the transaction, a transaction mode (e.g., in person, remote, etc.), etc.

At step S304, the authentication server computer 108A may receive the transaction message, and may generate an authentication request message. In some embodiments, the transaction message may have a different data format than the authentication request message. For example, certain information in the transaction message may be included in the authentication request message, while other information in the transaction request message can be excluded from the authentication request message. For example, in some embodiments, the token in the transaction request message may be included in the authentication request message, while the transaction amount may be excluded from the authentication request message. Once generated, the authentication server computer 108A can transmit the authentication request message to the directory server computer 110. The directory server computer 110 may then receive the authentication request message.

At step S306, after receiving the authentication request message, the directory server computer 110 may determine that it contains a token rather than a credential. In some embodiments, the token may contain a predetermined number of characters which indicates that it is a token, rather than a real credential such as a funding account number. For example, the token may have a BIN (bank identification number) that is associated with tokens and the directory server computer 110 may maintain a list of such token BINs. Once the directory server computer 110 determines that the token is present, it can generate and transmit a de-tokenization request message comprising the token to the processing network computer 118.

At step S308, after receiving the de-tokenization request message, processing network computer 118 may transmit the de-tokenization request message to token service computer 114. In other embodiments, the directory server computer 110 can transmit the de-tokenization request message directly to the token service computer 114, instead of via the processing network computer 118.

At step S310, the token service computer 114 determines the credential associated with the token included in the received de-tokenization request message. The token service computer 114 can access a database comprising mappings between credentials and tokens and can look up the credential using the token.

At step S312, after determining the credential, token service computer 114 may transmit the credential determined at step S310 to the processing network computer 118. In some embodiments, the token service computer 114 may also determine that the credential is associated with multiple tokens corresponding to multiple virtual accounts (or generically virtual records). The token service computer 114 can generate an optional virtual account indicator and can transmit this indicator along with the credential to the processing network computer 118.

At step S314, after receiving the credential and the optional virtual account indicator, the credential received from the token service computer 114 may be transmitted to the directory server computer 110. Before or after step S314, the directory server computer 110 can determine whether the authorizing entity associated with the token or the credential needs to authenticate the user for the transaction. For example, the directory server computer 110 may make the determination that transactions conducted with the token do not require additional user authentication processing by the authorizing entity before sending the de-tokenization request message (e.g., based on the token type) in step 306.

At step S316, directory server computer 110 may determine that the transaction conducted with the token does not require additional user authentication processing by the authorizing entity that issued the credential associated with the token. For example, directory server computer 110 may determine step up authentication by the authorizing entity or the directory server computer 110 is not needed, since the transaction is conducted using the token. The determination may be made based on the token being associated with a funding account identifier and a virtual account (e.g., as indicated by its BIN), or another value (e.g., the virtual account indicator described above) associated with the token or credential. If the directory server computer 110 determines additional user authentication processing by the authorizing entity is not required, the directory server computer 110 can generate an authentication response message. The authentication response message may include an authentication indicator (e.g., an ECI-05 indicator) indicating that the transaction is authenticated and an authentication cryptogram (e.g., a CAVV or card authentication verification value) that can be verified by the processing network computer 118 during the transaction authorization process. The authentication response message may have data which indicates that the transaction is fully authenticated (e.g., Transaction Status-Y, ECI-05 and CAVV).

It is also noted that tokens used by multiple people and that are derived from a single funding PAN (or generically, credentials) cannot be easily authenticated. In a typical scenario, an employer may have a funding account with a funding PAN for employees to use to make purchases. Each employee may be provided with a virtual account number (an example of a token) that is linked to the funding PAN. When a transaction is conducted by an employee using the virtual account number, the charge is debited to the funding PAN. In such cases, it is not possible for an issuer or a payment network to authenticate the employee using the virtual account number. This is because any information provided by the employee (e.g., an employee's phone number) will not match the information on file with the funding PAN (e.g., an employer's phone number). Thus, a problem that needs to be addressed relates to enabling virtual account numbers to be used while managing the risk associated with the transactions. Embodiments of the invention address this problem.

In some cases, the directory server computer 110 determines that the transaction conducted with the token does require additional user authentication processing by the authorizing entity that issued the credential. This determination may be performed as a default action based on this particular resource provider computer, or it may be based on a risk analysis performed by the resource provider computer 108, the authentication server computer 108A, or the directory server computer 110. If additional authentication processing is required, then instead of generating and transmitting an authentication response message to the authentication server computer 108A as in step S318, the directory server computer 110 can forward the authentication request message with the credential to the access control server computer 112A in FIG. 1. The access control server computer 112A can then transmit a challenge request message to the user device 102. The challenge request message may request a secret, biometric, or other authentication data from the user operating the user device 102. The user device 102 can then generate a challenge response message with the secret, biometric, or other authentication data, and can transmit it to the access control server computer 112A. The access control server computer 112A can then determine if the user and/or the user device 102 is authentic based upon the received secret, biometric, or other authentication data. If the user and/or the user device 102 are authenticated, then the access control server computer 112A can generate an authentication response message which may include an authentication indicator (e.g., an ECI-05 indicator) indicating that the transaction is authenticated and an authentication cryptogram (e.g., a CAVV or card authentication verification value) that can be verified by the processing network computer during the transaction authorization process. The authentication response message may be sent to the resource provider computer 108 via the directory server computer 110 and the authentication server computer 108A.

Returning to FIG. 3, at step S318, directory server computer 110 may transmit the authentication response message to the authentication server computer 108A.

At step S320, the authentication server computer 108A may transmit the authentication response message to the resource provider computer 108.

After resource provider computer 108 receives the authentication response message, resource provider computer 108 may perform an authorization process for the transaction.

Figure 4:
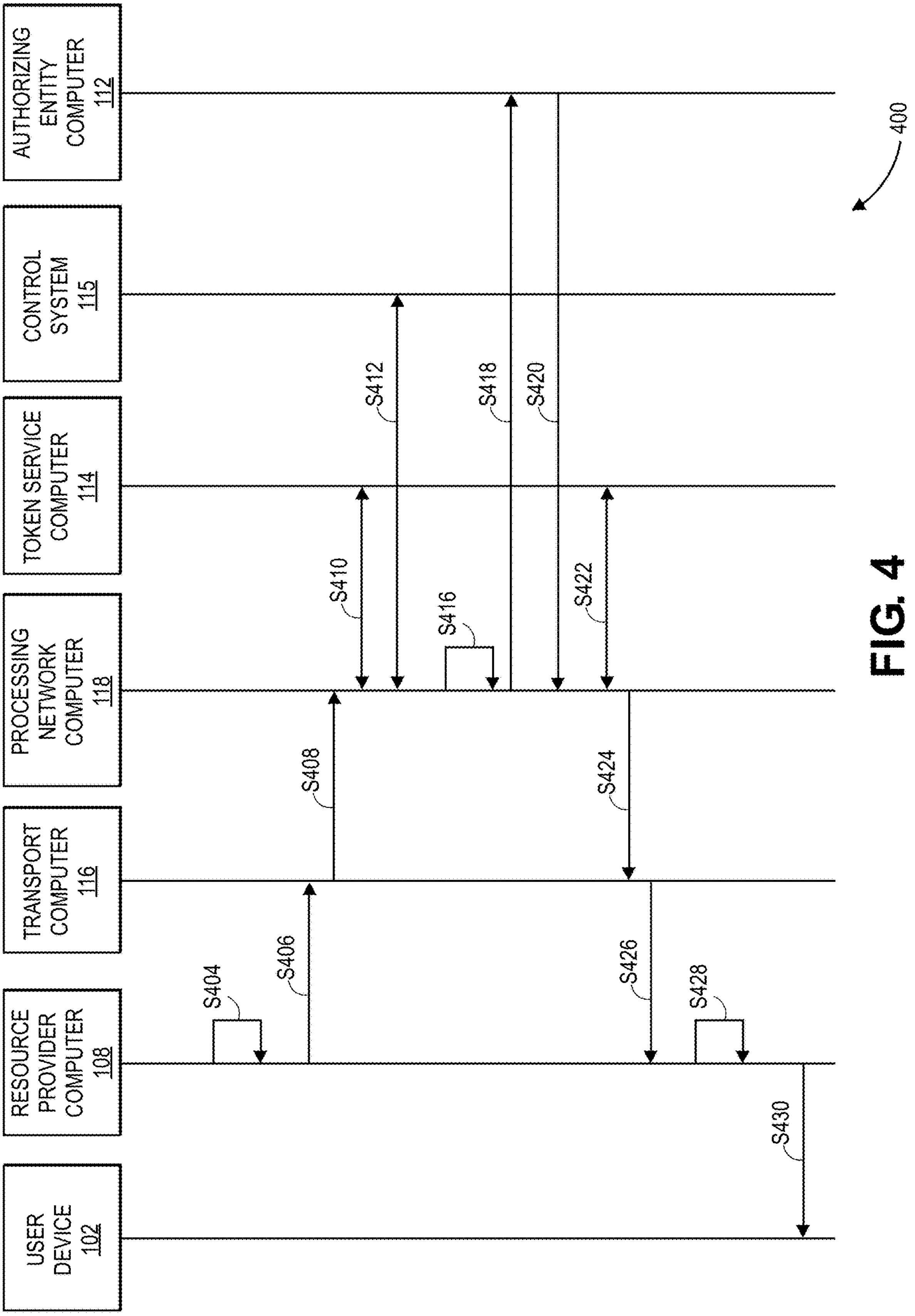
FIG. 4 illustrates a flow diagram of a method of performing a transaction according to some embodiments of the invention.

FIG. 4 illustrates a flow diagram of a method 400 of performing an authorization process for a transaction according to some embodiments of the invention, after the authentication process described in FIG. 3 is performed. The flow diagram illustrates a user device 102, a resource provider computer 108, a transport computer 116, a processing network computer 118, a token service computer 114, a control system 115, and an authorizing entity computer 112.

At step S404, the resource provider computer 108 may generate an authorization request message to obtain authorization for the transaction. The authorization request message comprises data elements including, but not limited to, the value for the transaction, the token, an expiration date associated with the token, a token cryptogram, the authentication indicator, and the authentication cryptogram.

At step S406, the resource provider computer 108 may send the authorization request message to the transport computer 116.

At step S408, the transport computer 116 may forward the authorization request message to the processing network computer 118.

At step S410, processing network computer 118 may de-tokenize the token by transmitting a de-tokenization request message comprising the token and an optional token cryptogram and transaction data elements to the token service computer 114. The token service computer 114 can determine the credential (e.g., the funding account number) and a credential expiration date associated with the token and can send it to the processing network computer 118. In some embodiments, the token service computer 114 can verify the token cryptogram and can confirm that the transaction is being conducted in a manner consistent with the token cryptogram. For example, the token cryptogram may be associated with an e-commerce transaction. If the transaction data elements do not indicate that the current transaction is an e-commerce transaction, then the token's use would be invalid for this transaction and the token service computer 114 would send an indication of this to the processing network computer 118.

At step S412, the processing network computer 118 can determine using the transaction controls in the control system 115, if the current transaction satisfies predetermined transaction controls, such as those described above. For example, a control associated with a particular token may be that the time of the transaction can only take place from 6 am to 12 pm. If the time of the current transaction is not within this window, then the processing network computer 118 can determine that the transaction should not be authorized and can transmit an authorization response message to the resource provider computer 108 declining the transaction.

At step S416, the processing network computer 118 may verify the authentication cryptogram in the authorization request message. In some embodiments, the processing network computer 118 can have a cryptographic key that corresponds to the cryptographic key that was used to create the authentication cryptogram. The authentication cryptogram can be a digital signature, which can be verified, for example, using a public key or a symmetric key.

The processing network computer 118 may further generate a modified authorization request message to include the credential instead of the token, the value, an expiration date for the credential, and the authentication indicator. If the authentication cryptogram is not verified, then the processing network computer 118 can omit the authentication indicator in the modified authorization request message.

At step S418, the processing network computer 118 can transmit the modified authorization request message to the authorizing entity computer 112. Authorizing entity computer 112 may can analyze the data associated with the authorization request message (e.g., the value or amount of the transaction, the authentication indicator, the status of the funding account associated with the credential, the status of the resource provider computer 108, etc.). After analyzing this information, the authorizing entity computer 112 can authorize or decline the transaction.

At step S420, the authorizing entity computer 112 may send an authorization response message indicating whether the transaction was authorized or declined to the processing network computer 118. The authorization response message may include the credential, an authorization indicator, transaction data, and any other suitable information.

At step S422, the processing network computer 118 can re-tokenize the credential before transmitting the authorization response message to the resource provider computer 108. The processing network computer 118 can send a re-tokenization request message comprising the credential to the token service computer 114. The token service computer 114 can then determine the token that was used for this transaction and replace the credential with the token in a modified authorization response message.

At step S424, the processing network computer 118 may forward the modified authorization response message to the transport computer 116.

At step S426, the transport computer 116 may forward the modified authorization response message to the resource provider computer 108.

At step S428, the resource provider computer 108 may release the resource(s) (e.g., purchased goods and/or services) to the user based on the authorization response message.

At step S430, the resource provider computer 108 may transmit a transaction response message to the user device 102 indicating that the transaction was successful or unsuccessful. In some embodiments, information from the transaction response message may be provided for display on the user device 102.

At the end of the day or at another time, a clearing and settlement process can take place between the transport computer 116, the processing network computer 118, and the authorizing entity computer 112.

Figure 5:
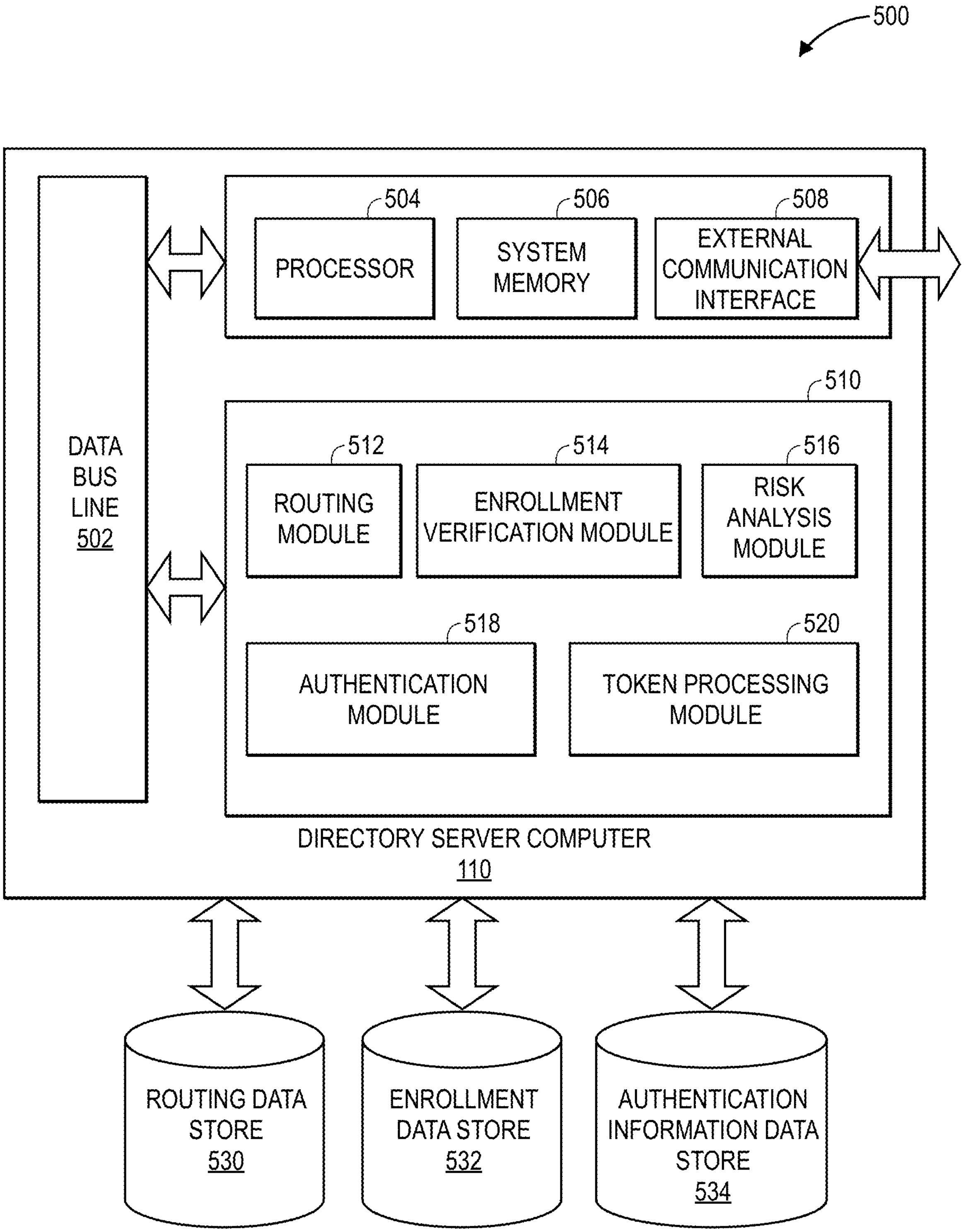
FIG. 5 illustrates a block diagram of a directory server computer according to an embodiment.

FIG. 5 illustrates a block diagram 500 of a directory server computer 110 according to an embodiment.

The directory server computer 110 may comprise a processor 504, which may be coupled to a system memory 506 and an external communication interface 508. A computer readable medium 510 may also be operatively coupled to the processor 504.

Computer readable medium 510 may also comprise code for implementing the methods discussed herein. For example, computer readable medium 510 may comprise code, executable by the processor 504 to perform a method comprising: receiving, by a directory server computer from an authentication server computer in a transaction, an authentication request message comprising a token, wherein the token was previously obtained by a resource provider computer from a user device, the user device associated with a user; transmitting, by the directory server computer, a de-tokenization request message comprising the token to a token service computer, wherein the token service computer determines a credential associated with the token, wherein the token is one of a plurality of tokens associated with the credential; receiving, by the directory server computer, the credential; determining, by directory server computer, that the token or the credential does not require additional user authentication processing; and transmitting an authentication response message with an authentication indicator indicating that the transaction is authenticated to the authentication server computer.

The computer readable medium 510 may comprise a number of software modules including a routing module 512, an enrollment verification module 514, a risk analysis module 516, an authentication module 518, and a token processing module 520. Although these various modules are depicted as being internal to the directory server computer 110, any number of these modules may instead be implemented as separate systems external to the directory server computer 110.

The routing module 512 may comprise code that, when executed, can cause the processor 504 to receive an authentication request message (e.g., from authentication server computer 108A of FIG. 1). Upon receipt of the authentication request message, or at another suitable time, the routing module 512 may cause the processor 504 to retrieve routing data from routing data store 530, a data store configured to store routing data associated with routing message and/or information between one or more entities (e.g., between an authentication server computer and a processing network computer). Although the routing data store 530 is depicted as external to the directory server computer 110, it should be appreciated that the routing data store 530 may be stored locally with respect to the directory server computer 110 (e.g., in system memory 506) and/or any suitable storage location accessible and/or communicatively coupled to the processor 504. The routing module 512 may be configured to cause the processor to route the authentication request message to a destination (e.g., the processing network computer 118 of FIG. 1) according to the obtained routing data.

The routing module 512 may further comprise code that, when executed, can cause the processor 504 to receive an authentication response message (e.g., from the processing network computer 118). Upon receipt of the authentication response message, or at another suitable time, the routing module 512 may cause the processor 504 to retrieve routing data from routing data store 530 to identify a destination for the authentication response message (e.g., the authentication server computer 108A of FIG. 1). The routing module 512 may be configured to cause the processor 504 to transmit the authentication response message to the identified destination according to the obtained routing data.

The enrollment verification module 514 may comprise code that, when executed, can cause the processor 504 to access enrollment data to perform an enrollment verification process on behalf of an access control server computer (e.g., the access control server computer 112A). In such embodiments, the enrollment verification module 514 may be configured to cause the processor 504 to access previously stored enrollment data to verify that the account associated with an authentication request message is enrolled in a secure authentication system. By way of example, the enrollment verification module 514 may cause the processor 504 to access enrollment data stored in the enrollment data store 532, a data store configured to store such information and accessible to the processor 504. If the account is not enrolled, the enrollment verification module 514 may be configured to cause the processor 504 to transmit an authentication response message indicating that the authentication request message was unsuccessful due to the lack of enrollment.

The risk analysis module 516 may comprise code that, when executed, can cause the processor 504 to perform a risk analysis using user-specific data, user device data, and/or transaction data received in an authentication request message. In such embodiments, the processor 504 may calculate a risk score for the transaction and transmit the risk score (e.g., to the processing network computer 118) for additional authentication processing.

The authentication module 518 may comprise code that, when executed, causes the processor 504 to determine that a token or a credential does not require additional user authentication processing, and transmit an authentication response message with an authentication indicator indicating that the transaction is authenticated to an authentication server computer (e.g., authentication server computer 108A).

some embodiments, the token processing module 520 may comprise code that, when executed, causes the processor 504 to transmit a de-tokenization and re-tokenization request messages to a token service computer, and receive tokenization and re-tokenization response messages from the token service computer.

Figure 6:
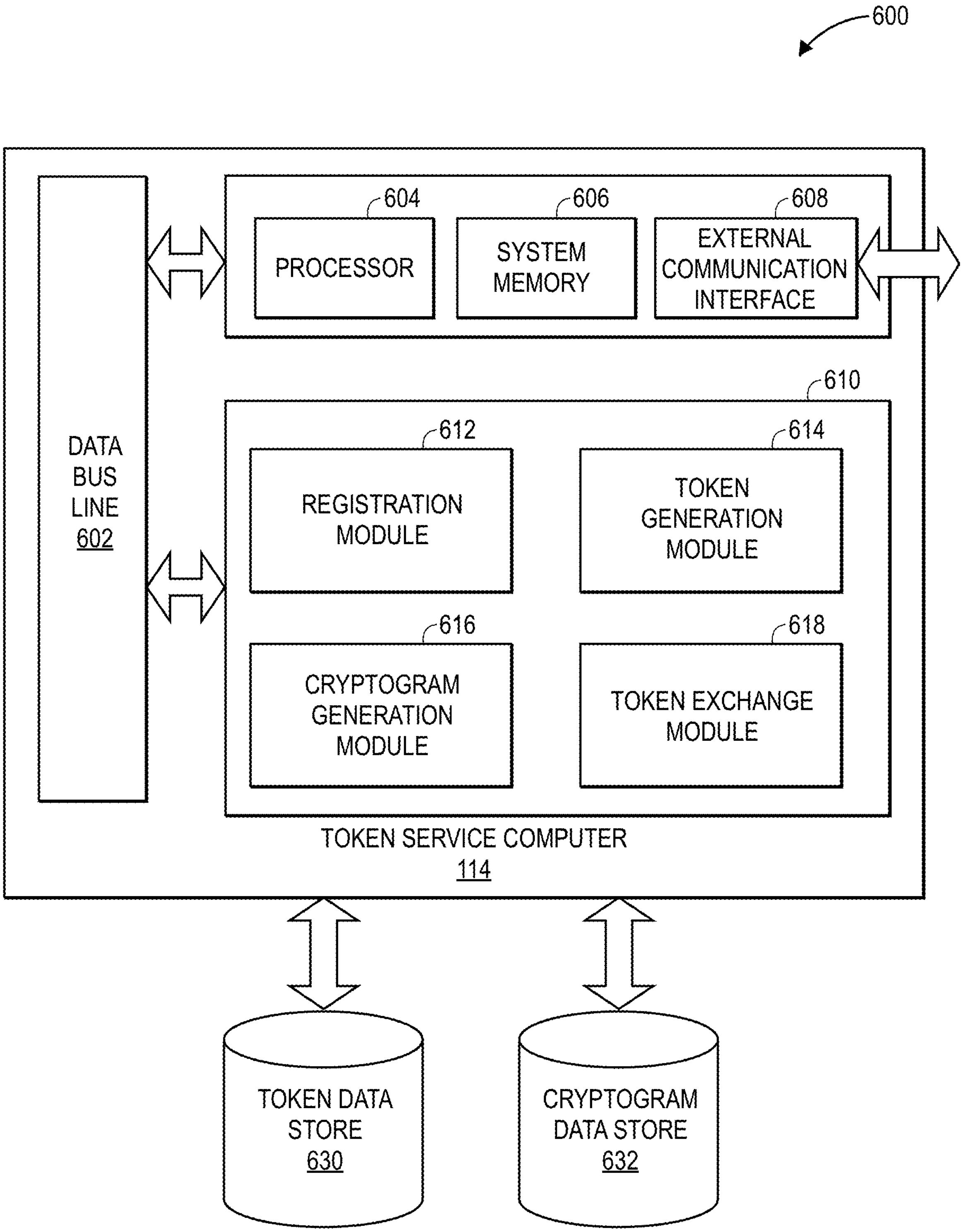
FIG. 6 illustrates a block diagram of a token service computer according to an embodiment.

FIG. 6 illustrates a block diagram 600 of a token service computer 114 according to an embodiment.

The token service computer 114 may comprise a processor 604, which may be coupled to a system memory 606 and an external communication interface 608. A computer readable medium 610 may also be operatively coupled to the processor 604. Computer readable medium 610 may also comprise code for implementing the methods discussed herein.

The computer readable medium 610 may comprise a number of software modules including a registration module 612, a token generation module 614, a cryptogram generation module 616, and a token exchange module 618. Although these various modules are depicted as being internal to the token service computer 114, any number of these modules may instead be implemented as separate systems external to the token service computer 114.

The registration module 612 may comprise code which can cause the processor 604 to register a credential requestor entity with a token data store 630 and to generate a credential requestor identifier for the registered entity. Some non-limiting examples of the credential requestor entities may include authorizing entities (e.g., issuers), resource providers (e.g., merchants, e-commerce merchants, transit authorities, etc.), directory server computers, processing network computers, transport computers (e.g., acquirers), user devices, or subcomponents and applications thereof.

The registration module 612 may be configured to cause the processor 604 to receive registration information such as an entity name, contact information, an entity type (e.g., user, directory server computer, resource provider, service provider, transaction processor, authorizing entity, transport entity, etc.), and any other relevant information for token generation processing. In some examples, registration module 612 may be configured to cause the processor 604 to provide one or more interfaces for collecting registration information. Such interfaces may be provided by the processor 604 and rendered via an application and/or website managed by the processor 604 as part of the functionality of registration module 612. In some embodiments, the registration module 612 may cause the processor 604 to validate the information and store the token requestor details in the token data store 630. The registration module 612 may also generate a token requestor ID after successful registration. In some embodiments, the token requestor ID may be a credential. However, other formats of the token requestor identifier are possible. The registration module 612 may further be configured to transmit the token requestor ID to the token requestor.

The token generation module 614 may be configured to cause the processor 604 generate a token in response to a token request message from a token requestor (e.g., directory server computer 110 on behalf of the resource provider computer 108). In one embodiment, the token generation module 614 may cause the processor 604 to receive a token request message (e.g., a message including a token requestor ID, an account number (e.g., PAN), an expiration date, a CVV2, etc.). In some embodiments, the token generation module 614 may cause the processor 604 to validate the token requestor ID and generate a token (e.g., a token linked to a virtual account number for the PAN). In one embodiment, the token generation module 614 may cause the processor 604 to generate a token response message including the generated token. The token data store 630 may be utilized by the processor 604 to maintain a correlation (e.g., a mapping) between a credential (e.g., an account number (e.g., a PAN)), a token requestor ID, and one or more tokens. In an embodiment, the token generation module 614 may determine if a predefined number of tokens already exist in the token data store 630 for the credential.

The cryptogram generation module 616 may be configured to cause the processor 604 to receive an authentication request message from a credential requestor (e.g., a resource provider computer). The cryptogram generation module 616 may be configured to cause the processor 604 to generate a token authentication cryptogram (e.g., a TAVV).

The token exchange module 618 may comprise code, executable by the processor 604, to cause the processor 604 to allow registered entities to request a credential (e.g., a PAN) for a given token. In one embodiment, token exchange module 618 may be configured to cause processor 604 to validate the credential/token mapping (e.g., a PAN to token mapping). Upon successful validation, the token exchange module 618 may be configured to cause processor 604 to retrieve the credential (e.g., the PAN) and provide it to the requesting entity.

Figure 7:
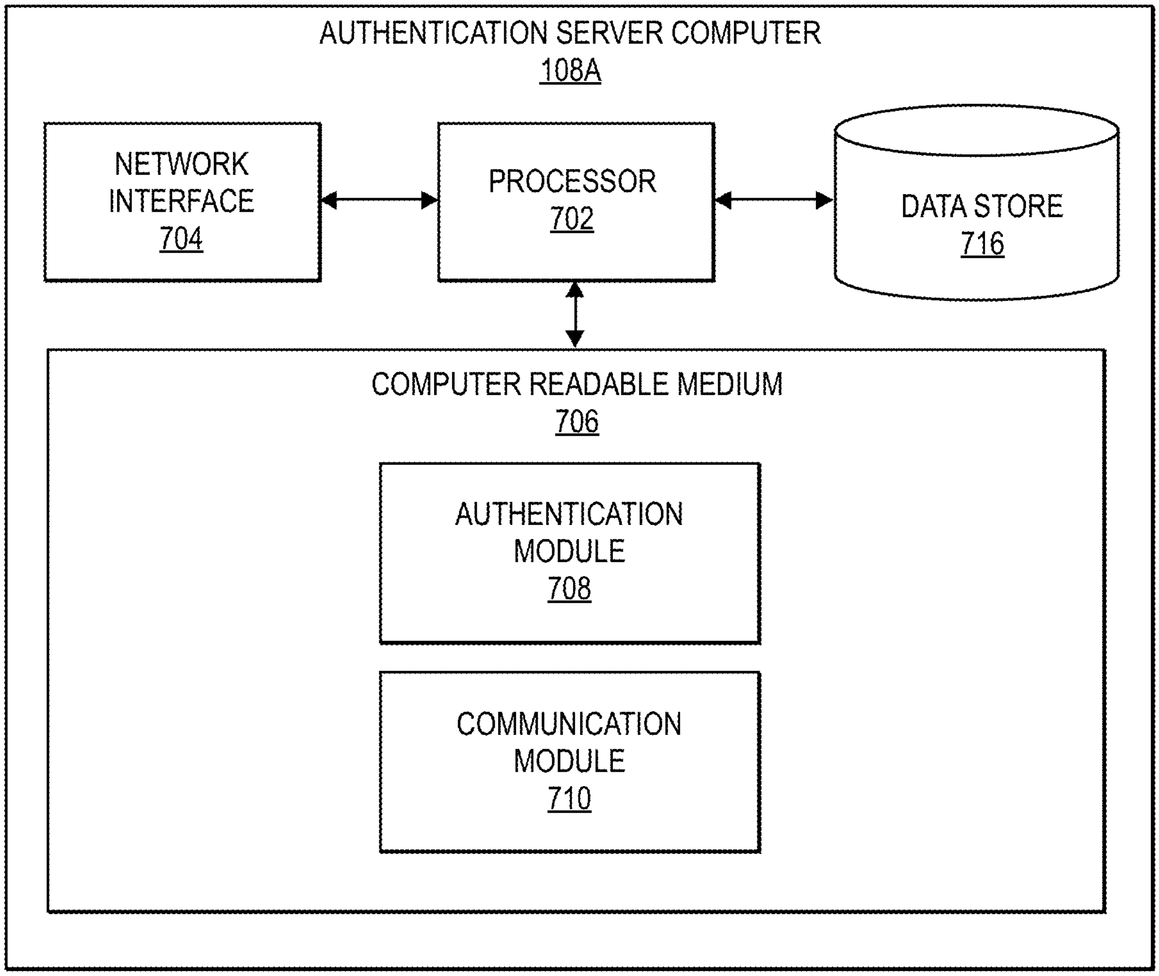
FIG. 7 illustrates a block diagram of an authentication server computer according to an embodiment.

FIG. 7 illustrates a block diagram of an authentication server computer 108A. The authentication server computer 108A may include a processor 702, coupled to a network interface 704, a data store 716, and a computer readable medium 706.

The data store 716 can store data regarding different resource providers that may request that the authentication server computer 108A perform authentication processing. It may also contain addresses for directory servers to route authentication messages.

The computer readable medium 706 comprises an authentication initiation module 708 and a communication module 710. The authentication initiation module 708 can comprise code which can initiate and perform authentication processing.

The computer readable medium 706 comprises code, executable by the processor 702, to perform operations comprising: a non-transitory computer readable medium comprising code, executable by the processor to perform a method comprising: receiving, from an authentication server computer in a transaction, an authentication request message comprising a token, wherein the token was previously obtained by a resource provider computer from a user device, the user device associated with a user; transmitting a de-tokenization request message comprising the token to a token service computer, wherein the token service computer determines a credential associated with the token, wherein the token is one of a plurality of tokens associated with the credential; receiving the credential; determining that the token or the credential does not require additional user authentication processing; and transmitting an authentication response message with an authentication indicator indicating that the transaction is authenticated to the authentication server computer.

Figure 8:
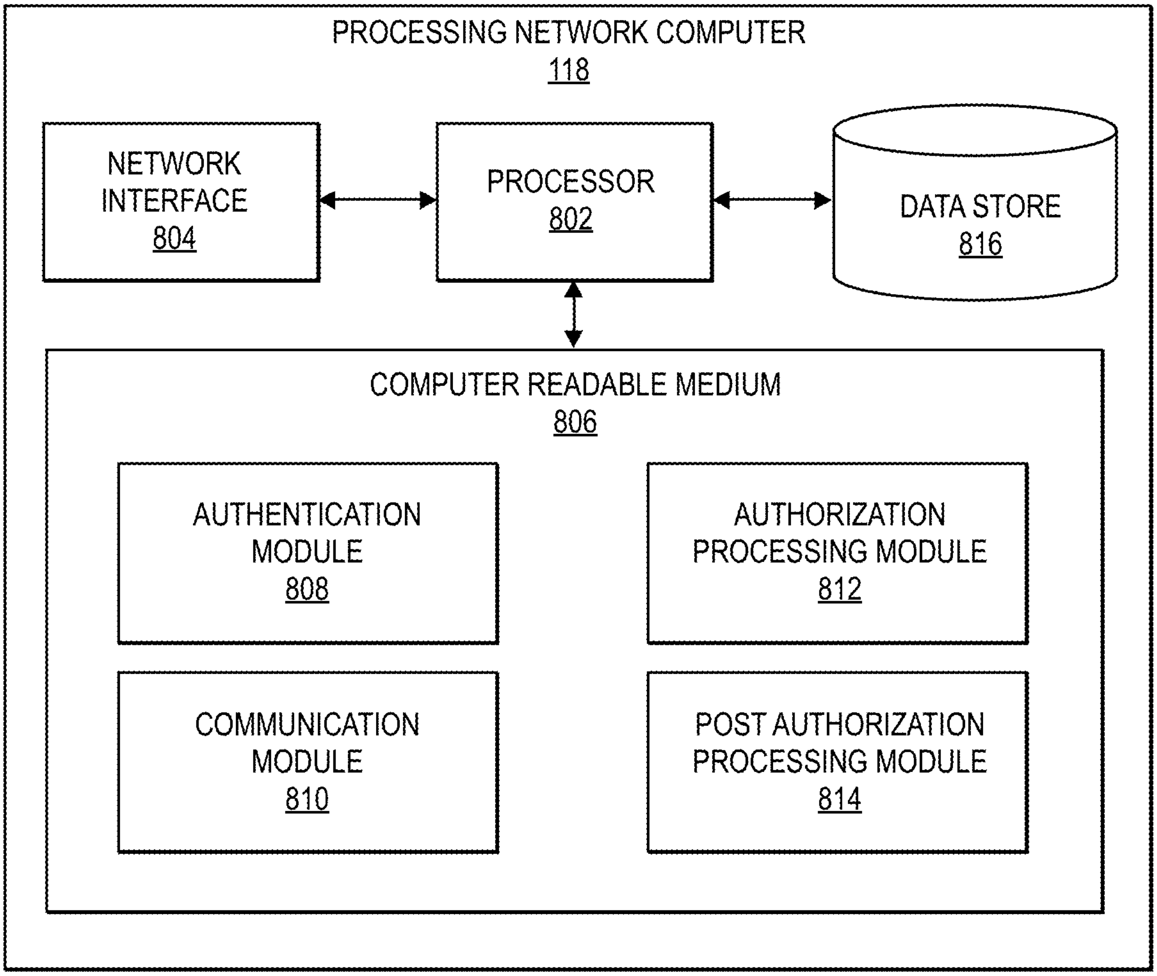
FIG. 8 illustrates a block diagram of a processing network computer according to an embodiment.

FIG. 8 illustrates a block diagram of a processing network computer 118 according to an embodiment. The processing network computer 118 may include a processor 802, coupled to a network interface 804, a data store 816, and a computer readable medium 806.

The data store 816 can be implemented using any combination of any number of non-volatile memories (e.g., flash memory) and volatile memories (e.g., DRAM, SRAM), or any other non-transitory storage medium, or a combination thereof media. The data store 816 may store tokens, credentials, encryption keys, virtual accounts, funding accounts, and/or other information as described herein.

The computer readable medium 806 may comprise a number of software modules including an authentication module 808, a communication module 810, an authorization processing module 812, and a post authorization processing module 814.

The authentication module 808 may comprise code, executable by the processor 802, to perform authentication processes including cryptogram generation or validation. The communication module 810 may comprise code, executable by the processor 802, to communicate using network interface 804 with one or more other systems. The authorization processing module 812 may comprise code, executable by the processor 802, to perform authorization processing. The post authorization processing module 814 may comprise code, executable by the processor 802, to perform clearing and settlement processing.

Embodiments of the invention provide for a number of advantages. For example, embodiments can reduce the number of steps relative to conventional authentication processes performed for transactions conducted using a distributed system. For example, as explained above, embodiments of the invention can omit authentication request messages that are transmitted to access control server computers and can also omit any challenges to users or their user devices associated with those authentication request messages. By reducing the number of steps to process a transaction, network, memory, and processing resources of such systems can be reduced. Furthermore, transactions can be processed more quickly using embodiments of the invention, because fewer steps are being performed (e.g., not performing steps for step-up authentication) and fewer messages are being sent over a network as compared to conventional processes. Still further, by omitting the challenges to the user, the user experiences less friction.

Embodiments of the invention have other security advantages. Because tokens are used instead of credentials such as funding account numbers, the funding account numbers are protected from hackers, thieves, of man in the middle attacks. If an unauthorized user obtains a token, then the credential and the other tokens associated with the credentials are not compromised. Further, as noted above, the use of transaction controls also restricts the use of the tokens to predetermined situations, thereby reducing the risk of unauthorized transactions conducted using credentials even though in some instances authentication indicators for authentication processes can be provided even if the authentications are not performed by authorizing entities.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a directory server computer from an authentication server computer in a transaction, an authentication request message comprising a token, wherein the token was previously obtained by a resource provider computer from a user device, the user device associated with a user;

transmitting, by the directory server computer, a de-tokenization request message comprising the token and an expiration date for the token to a token service computer, wherein the token service computer determines a credential associated with the token, wherein the token is one of a plurality of tokens associated with the credential;

receiving, by the directory server computer, the credential and a second expiration date;

determining, by the directory server computer, that the credential is a virtual credential and is associated with a funding account identifier;

determining, by directory server computer, that additional user authentication processing is not required because the credential is a virtual credential and is associated with the funding account identifier; and transmitting an authentication response message with an authentication indicator indicating that the transaction is authenticated to the authentication server computer;

receiving, by a processing network computer from the resource provider computer, an authorization request message comprising a value, the token and the authentication indicator;

obtaining, by the processing network computer from the token service computer, the credential using the token;

modifying, by the processing network computer, the authorization request message to include the credential instead of the token;

determining, by the processing network computer, that the token or the credential are associated with transaction controls in a control system;

determining, by the processing network computer, that the modified authorization request message satisfies the transaction controls, wherein the modified authorization request message is not transmitted to an authorizing entity computer if the transaction controls are not satisfied; and transmitting, by the processing network computer, the modified authorization request message comprising the credential to the authorizing entity computer for authorization.

2. The method of claim 1, wherein the plurality of tokens are linked to different virtual records used by different users, and wherein the method further comprises:

receiving, by the authentication server computer, the authentication response message comprising the authentication indicator; and transmitting, by the authentication server computer, the authentication response message comprising the authentication indicator to the resource provider computer, wherein the resource provider computer generates the authorization request message.

3. The method of claim 2, further comprising:

wherein an authentication cryptogram and the authentication indicator are in the authentication response message.

4. The method of claim 3, wherein the authorization request message further comprises a token cryptogram.

5. The method of claim 4, further comprising:

verifying, by the token service computer, the token cryptogram before providing the credential to the processing network computer.

6. The method of claim 5, further comprising:

verifying, by the processing network computer, that the authentication cryptogram is valid before transmitting the modified authorization request message to the authorizing entity computer.

7. The method of claim 1, wherein the modified authorization request message comprises the authentication indicator.

8. The method of claim 1, wherein the transaction controls are rules provided to the control system by an entity other than the user.

9. The method of claim 1, wherein the token has a same format as the credential.

10. The method of claim 1, wherein the credential is a PAN.

11. The method of claim 1, wherein the resource provider computer provides access to secure data or a secure location.

12. A system comprising:

a directory server computer comprising a first processor, and a first non-transitory computer readable medium comprising first code, executable by the first processor to perform a first method comprising, receiving, from an authentication server computer in a transaction, an authentication request message comprising a token, wherein the token was previously obtained by a resource provider computer from a user device, the user device associated with a user, transmitting a de-tokenization request message comprising the token and an expiration date for the token to a token service computer, wherein the token service computer determines a credential associated with the token, wherein the token is one of a plurality of tokens associated with the credential, receiving the credential and a second expiration date, determining that the credential is a virtual credential and is associated with a funding account identifier, determining that additional user authentication processing is not required because the credential is a virtual credential and is associated with the funding account identifier, and transmitting an authentication response message with an authentication indicator indicating that the transaction is authenticated to the authentication server computer; and a processing network computer comprising a second processor and a second non-transitory computer readable medium, the second non-transitory computer readable medium comprising second code, executable by the second processor to perform a second method comprising, receiving, from the resource provider computer, an authorization request message comprising a value, the token and the authentication indicator, obtaining, from the token service computer, the credential using the token;

modifying the authorization request message to include the credential instead of the token, determining that the token or the credential are associated with transaction controls in a control system, determining that the modified authorization request message satisfies the transaction controls, wherein the modified authorization request message is not transmitted to an authorizing entity computer if the transaction controls are not satisfied, and transmitting the modified authorization request message comprising the credential to the authorizing entity computer for authorization.

13. The system of claim 12, wherein the token is linked to the credential, and the credential is associated with an account.

14. The system of claim 13, wherein the plurality of tokens are linked to different virtual accounts.

15. The system of claim 13, wherein the resource provider computer is a merchant computer.

16. The system of claim 15, wherein a resource provided to the user by a resource provider operating the resource provider computer is secure data, an item, or a service.

17. The system of claim 12, wherein the token has the same format as the credential.

18. The system of claim 12, the funding account identifier is a credit card or debit card number.

19. The system of claim 12, wherein the token is a payment token and the credential is a payment card number.

20. The system of claim 12, wherein the credential is a primary account number.

* * * * *